United States Patent
Kondo et al.

(10) Patent No.: US 9,758,007 B2
(45) Date of Patent: Sep. 12, 2017

(54) VEHICLE HEIGHT ADJUSTMENT APPARATUS

(71) Applicant: Aisin Seiki Kabushiki Kaisha, Kariya (JP)

(72) Inventors: Yusuke Kondo, Niwa-gun (JP); Takanori Suzuki, Nisshin (JP); Atsuto Ogino, Chiryu (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 411 days.

(21) Appl. No.: 14/548,686

(22) Filed: Nov. 20, 2014

(65) Prior Publication Data

US 2015/0151603 A1 Jun. 4, 2015

(30) Foreign Application Priority Data

Nov. 29, 2013 (JP) ................. 2013-248088

(51) Int. Cl.
  *B60G 17/056* (2006.01)
  *B60G 17/017* (2006.01)
  *B60G 17/052* (2006.01)

(52) U.S. Cl.
  CPC ....... *B60G 17/0565* (2013.01); *B60G 17/017* (2013.01); *B60G 17/0525* (2013.01);
  (Continued)

(58) Field of Classification Search
  CPC .............. B60G 17/0565; B60G 17/017; B60G 17/0525; B60G 2202/152;
  (Continued)

(56) References Cited

U.S. PATENT DOCUMENTS 4,568,093 A    2/1986  Shimizu et al.
4,718,695 A *  1/1988  Kawagoe ........... B60G 17/0185
                                                 280/5.501

(Continued)

FOREIGN PATENT DOCUMENTS

GB    2 134 460 A    8/1984
JP    2002-337531    11/2002

OTHER PUBLICATIONS

Extended European Search Report issued Jun. 1, 2015 in Patent Application No. 14194355.5.

*Primary Examiner* — Paul N Dickson
*Assistant Examiner* — Joselynn Y Sliteris
(74) *Attorney, Agent, or Firm* — Oblon, McClelland, Maier & Neustadt, L.L.P.

(57) ABSTRACT

A vehicle height adjustment apparatus includes: vehicle height adjustment units respectively provided to correspond to wheels of a vehicle body, and adjusting a vehicle height in response to the supply and discharge of a working fluid; a pressure tank storing the working fluid; a compressor pressure-feeding the working fluid; a valve body block formed by opening and closing valves, and interposed between the pressure tank and the compressor, and the vehicle height adjustment units; and a control unit adjusting a vehicle height by controlling the valve body block, wherein the valve body block is connected to the pressure tank, and working fluid outlet and inlet of the compressor, and upon the completion of the pressure feed of the working fluid, the control unit controls such that the working fluid outlet and inlet are communicated with each other.

6 Claims, 6 Drawing Sheets

(52) U.S. Cl.
CPC .. *B60G 2202/152* (2013.01); *B60G 2500/202* (2013.01); *B60G 2500/205* (2013.01); *B60G 2500/2021* (2013.01); *B60G 2600/02* (2013.01); *B60G 2800/20* (2013.01); *B60G 2800/202* (2013.01)

(58) Field of Classification Search
CPC ...... B60G 2800/202; B60G 2500/2021; B60G 2500/205; B60G 2600/02; B60G 2800/20; B60G 2500/202
See application file for complete search history.

(56) References Cited

U.S. PATENT DOCUMENTS

| | | | | |
|---|---|---|---|---|
| 4,911,617 | A * | 3/1990 | Buma | B60G 17/052 417/439 |
| 6,726,189 | B2 | 4/2004 | Folchert et al. | |
| 7,590,478 | B2 * | 9/2009 | Folchert | B60G 17/052 267/64.11 |
| 9,168,806 | B2 * | 10/2015 | Kondo | B60G 21/073 |
| 9,266,403 | B2 * | 2/2016 | Suzuki | B60G 17/017 |
| 9,393,849 | B2 * | 7/2016 | Suzuki | B60G 17/017 |
| 2003/0218281 | A1 * | 11/2003 | Ocker | B60G 17/0523 267/64.28 |

* cited by examiner

VEHICLE HEIGHT ADJUSTMENT APPARATUS

CROSS REFERENCE TO RELATED APPLICATIONS

This application is based on and claims priority under 35 U.S.C. §119 to Japanese Patent Application 2013-248088, filed on Nov. 29, 2013, the entire contents of which are incorporated herein by reference.

TECHNICAL FIELD

This disclosure relates to a vehicle height adjustment apparatus.

BACKGROUND DISCUSSION

In the related art, there is provided a vehicle equipped with a suspension that includes air springs using compressed air and the like. There is also a vehicle equipped with a vehicle height adjustment apparatus using the air springs. There is a so-called closed type vehicle height adjustment apparatus. This type of vehicle height adjustment apparatus increases a vehicle height by supplying a working fluid (high-pressure air) stored in a pressure tank to the air springs that change a suspension state of each wheel. The vehicle height adjustment apparatus may pressure-feed the working fluid to the air springs using a compressor. In contrast, the compressor may draw the working fluid from the air springs to the pressure tank so as to decrease the vehicle height. In this vehicle height adjustment apparatus, a group of valves are interposed between the pressure tank and the compressor, and the air springs so as to select the flow direction of the working fluid. JP 2002-337531A is an example of the related art.

In the above-mentioned closed type vehicle height adjustment apparatus, a pressure difference between the forward and rearward pressure tubes of the pressure tank and the compressor may increase after the drive of the compressor. For this reason, pressure may be unintentionally applied to the group of valves that are interposed between the pressure tank and the compressor, and the air springs. It is desirable to reduce the impact of the unintended pressure so that the valves can be smoothly controlled, that is, the vehicle height adjustment apparatus can be smoothly controlled.

SUMMARY

Thus, a need exists for a new vehicle height adjustment apparatus which is not suspectable to the drawback mentioned above.

An aspect of this disclosure is directed to a vehicle height adjustment apparatus including a plurality of vehicle height adjustment units that are respectively provided to correspond to wheels of a vehicle body, and adjust a vehicle height in response to the supply and discharge of a working fluid; a pressure tank that stores the working fluid; a compressor that pressure-feeds the working fluid; a valve body block that is formed by a plurality of opening and closing valves, and is interposed between the pressure tank and the compressor, and the vehicle height adjustment units; and a control unit that adjusts a vehicle height for each of the vehicle height adjustment units by controlling the valve body block. The valve body block is connected to the pressure tank, and is connected to a working fluid outlet and a working fluid inlet of the compressor. Upon the completion of the pressure feed of the working fluid by the compressor, the control unit controls the opening and closing valves in such a manner that the working fluid outlet and the working fluid inlet are communicated with each other. According to the aspect of this disclosure, when the pressure feed of the working fluid by the compressor is completed, the working fluid outlet and the working fluid inlet of the compressor are communicated with each other, and thus the pressure of the working fluid outlet becomes the same as that of the working fluid inlet. As a result, a pressure difference between forward and rearward sides of the pressure tank and the compressor decreases, and a pressure difference between the pressure tank and the valve body block decreases, and thus it is possible to smoothly open and close the opening and closing valves of the valve body block.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, an exemplary embodiment of this disclosure will be disclosed. The configuration of the embodiment illustrated hereinafter, and the action and result (effects) brought by the configuration are only an example. This disclosure can be realized using configurations other than the configuration disclosed in the following embodiment, and various effects (including secondary effects as well) can be obtained by a basic configuration.

Figure 1:
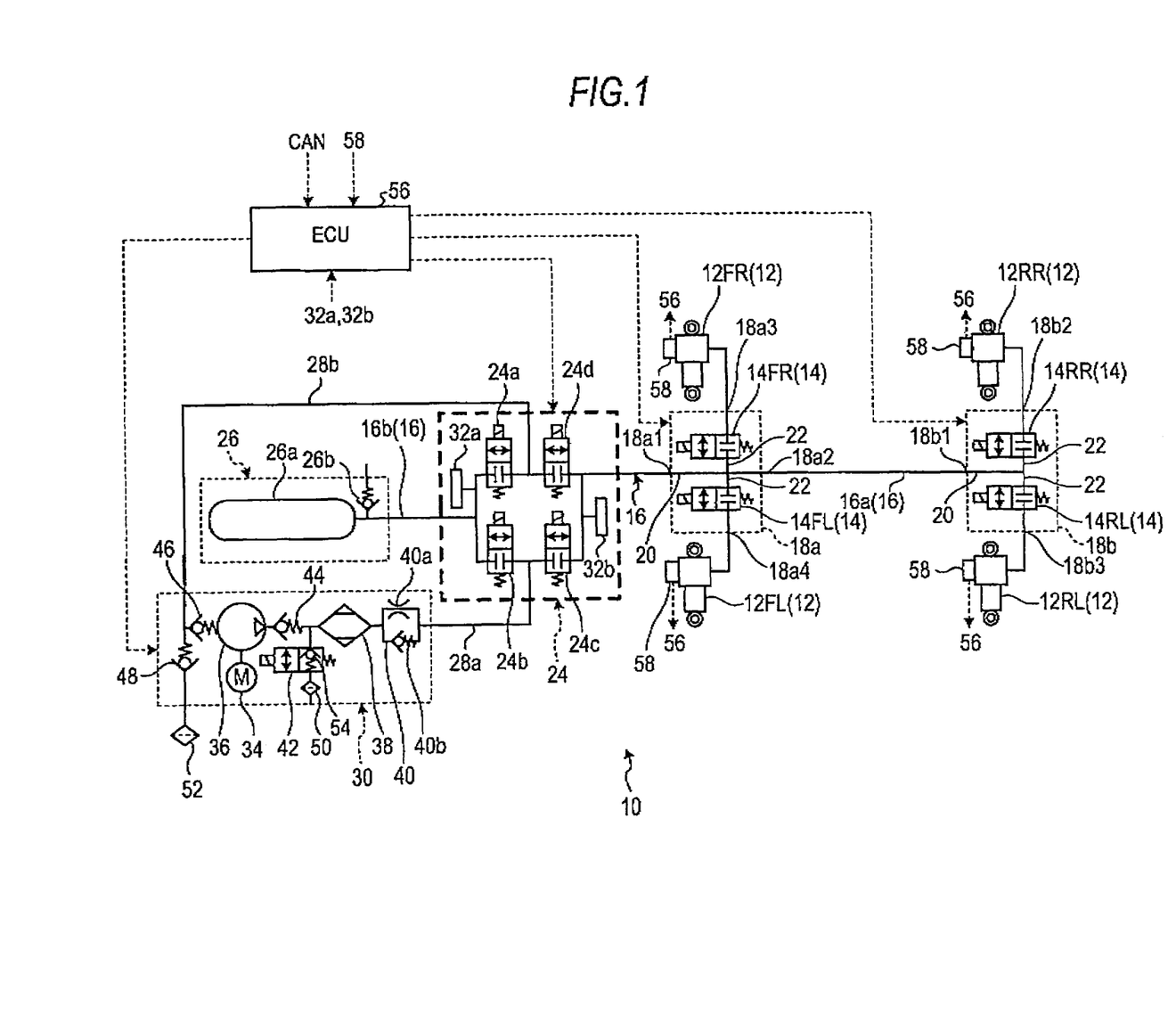
FIG. 1 is a diagram illustrating the configuration of a vehicle height adjustment apparatus according to an embodiment, and illustrates a non-flowing state of a working fluid.

FIG. 1 is a diagram illustrating the configuration of a vehicle height adjustment apparatus 10 according to the embodiment, and illustrates a non-flowing state of a working fluid.

Air springs 12FR, 12FL, 12RR, 12RL (hereinafter, also simply referred to as an "air spring 12" when it is not necessary to distinguish the air springs 12FR, 12FL, 12RR, 12RL therebetween) are respectively connected to the wheels of a vehicle which are not illustrated, and function as vehicle height adjustment units. When the working fluid (for example, air) is supplied to or discharged from the air spring 12, the air spring 12 changes a suspension state of the wheel with respect to a vehicle body of the vehicle. The air spring 12 absorbs the vibration of the vehicle, using the elasticity of compressed air sealed in the air spring 12. The air springs 12FR and 12FL may be referred to as front vehicle height adjustment units. The air springs 12RR and 12RL may be referred to as rear vehicle height adjustment units. A well-known structure can be used in the air spring 12. The air spring 12 absorbs tiny vibrations better than a metallic spring because the air spring 12 uses the elasticity of air. It is possible to maintain a constant vehicle height, adjust the vehicle height to a desired height, or change a spring constant to a desired value by controlling air pressure.

The air springs 12FR and 12FL which are the front vehicle height adjustment units are connected to a main flow passage 16 via respective vehicle height adjustment valves 14FR and 14FL, with the working fluid flowing through the main flow passage 16. Similarly, the air springs 12RR and 12RL which are the rear vehicle height adjustment units are connected to the main flow passage 16 via respective vehicle height adjustment valves 14RR and 14RL, with the working fluid flowing through the main flow passage 16. The vehicle height adjustment valves 14FR, 14FL, 14RR, and 14RL may be simply referred to as a "vehicle height adjustment valve 14" when it is not necessary to distinguish the vehicle height adjustment valves 14FR, 14FL, 14RR, and 14RL therebetween. In the embodiment, the air spring 12 and the vehicle height adjustment valve 14 may be collectively referred to as a vehicle height adjustment unit.

In the embodiment, the vehicle height adjustment valves 14FR and 14FL are disposed by being embedded in a flow passage block made of metal, resin, or the like, and form a front wheel valve unit 18a. Similarly, the vehicle height adjustment valves 14RR and 14RL are disposed by being embedded in the flow passage block, and form a rear wheel valve unit 18b. In another embodiment, the vehicle height adjustment valves 14 may be disposed separately from each other. In this case, the degree of freedom in the layout of the vehicle height adjustment valve 14 improves. The four vehicle height adjustment valves 14 may be integrated into one unit. It is possible to reduce the number of components by integrating the four vehicle height adjustment valves 14 into one unit.

As illustrated in FIG. 1, each of the front wheel valve unit 18a and the rear wheel valve unit 18b is formed as a separate unit, and the front wheel valve unit 18a can be disposed close to the front wheels. As a result, it is possible to reduce the length of a flow passage tube disposed from the front wheel valve unit 18a to each of the respective air springs 12 of the front wheels, compared to when the entirety of the vehicle height adjustment valves 14 are integrated into one unit. Similarly, it is possible to dispose the rear wheel valve unit 18b close to the rear wheels, and reduce the length of a flow passage tube disposed from the rear wheel valve unit 18b to each of the respective air springs 12 of the rear wheels, compared to when the entirety of the vehicle height adjustment valves 14 are integrated into one unit. As a result, it is possible to facilitate the routing of the flow passage tubes, and reduce a potential risk such as damage of the flow passage tubes by reducing the length of the flow passage tubes.

A first port 18a1 is formed in one end surface of the front wheel valve unit 18a, and is connected to the main flow passage 16, and a main flow passage channel 20 is formed inside the front wheel valve unit 18a so as to pass through the front wheel valve unit 18a, with the first port 18a1 being one end of the main flow passage channel 20, and a second port 18a2 being the other end of the main flow passage channel 20. Two secondary flow passage channels 22 are formed inside the front wheel valve unit 18a so as to branch off from the main flow passage channel 20. One end of the vehicle height adjustment valve 14FR is connected to one of the secondary flow passage channels 22, and the other end of the vehicle height adjustment valve 14FR is connected to the air spring 12FR via a third port 18a3. Similarly, one end of the vehicle height adjustment valve 14FL is connected to the other secondary flow passage channel 22, and the other end of the vehicle height adjustment valve 14FL is connected to the air spring 12FL via a fourth port 18a4.

A main communication flow passage 16a (the main flow passage 16) is connected to the second port 18a2. The main communication flow passage 16a is connected to a first port 18b1 of the rear wheel valve unit 18b. The main flow passage channel 20 is formed inside the rear wheel valve unit 18b so as to have the first port 18b1 as one end of the main flow passage channel 20. Two secondary flow passage channels 22 are also formed inside the rear wheel valve unit 18b so as to branch off from the main flow passage channel 20. One end of the vehicle height adjustment valve 14RR is connected to one of the secondary flow passage channels 22, and the other end of the vehicle height adjustment valve 14RR is connected to the air spring 12RR via a second port 18b2. One end of the vehicle height adjustment valve 14RL is connected to the other secondary flow passage channel 22, and the other end of the vehicle height adjustment valve 14RL is connected to the air spring 12RL via a third port 18b3.

FIG. 1 illustrates an example in which the front wheel valve unit 18a adopts four ports, and the rear wheel valve unit 18b adopts three ports, but for example, the rear wheel valve unit can adopt four ports similar to the front wheel valve unit. When the rear wheel valve unit 18b adopts four ports similar to the front wheel valve unit 18a, a port corresponding to the second port 18a2 is sealed with a plug cap (blind cap). In this case, it is possible to reduce the number of the types of components, and the design costs by using a common valve unit for the front and rear wheel valve units.

The same type of opening and closing valve can be used in the vehicle height adjustment valve 14 (14FR, 14FL, 14RR, 14RL), and for example, the vehicle height adjustment valve 14 has an ON/OFF controlled solenoid and a spring. Any of the control valves can be a normally closed electro-magnetic control valve that is closed when the solenoid of the control valve is not energized.

The main flow passage 16 is connected to a pressure tank 26 via a circuit valve block 24 and a tank connection main flow passage 16b. The circuit valve block 24 is connected to an outlet of a compressor unit 30 via a compressor outlet flow passage 28a. The circuit valve block 24 is connected to an inlet of the compressor unit 30 via a compressor inlet flow passage 28b. The circuit valve block 24 is formed as a valve body block that includes a plurality of the opening and closing valves, for example, four opening and closing valves. Specifically, the circuit valve block 24 includes a first opening and closing valve 24a, a second opening and closing valve 24b, a third opening and closing valve 24c, and a fourth opening and closing valve 24d. A first end of each of the first opening and closing valve 24a and the second opening and closing valve 24b is connected to the pressure tank 26 via the tank connection main flow passage 16b (the main flow passage 16). A first end of the third opening and closing valve 24c is connected to the outlet of the compressor unit 30 via the compressor outlet flow passage 28a, and is connected to a second end of the second opening and closing valve 24b. A second end of the third opening and closing valve 24c is connected to the air spring 12 (the vehicle height adjustment unit and the front wheel valve unit 18a). A first end of the fourth opening and closing valve 24d is connected to the inlet of the compressor unit 30 via the compressor inlet flow passage 28b, and is connected to a second end of the first opening and closing valve 24a. A second end of the fourth opening and closing valve 24d is connected to the air spring 12 (the vehicle height adjustment unit and the front wheel valve unit 18a).

The same type of opening and closing valve can be used in the first opening and closing valve 24a, the second opening and closing valve 24b, the third opening and closing valve 24c, and the fourth opening and closing valve 24d of the circuit valve block 24, and for example, each of the first opening and closing valve 24a, the second opening and closing valve 24b, the third opening and closing valve 24c, and the fourth opening and closing valve 24d has an ON/OFF controlled solenoid and a spring. Any of the opening and closing valves can be a normally closed electromagnetic control valve that is closed when the solenoid of the control valve is not energized.

The circuit valve block 24 includes a first pressure sensor 32a for detecting the pressure of the pressure tank 26, and a second pressure sensor 32b for detecting the pressure of the air spring 12 (the vehicle height adjustment unit and the front wheel valve unit 18a). For example, when the first opening and closing valve 24a and the second opening and closing valve 24b are closed, the first pressure sensor 32a can accurately detect the static pressure of the pressure tank 26. When at least one of the first opening and closing valve 24a and the second opening and closing valve 24b is opened and the working fluid flows through the channel, the first pressure sensor 32a can detect the dynamic pressure of the pressure tank 26. Similarly, when the third opening and closing valve 24c and the fourth opening and closing valve 24d are closed, and at least one of the respective vehicle height adjustment valves 14FR and 14FL of the front wheels is opened, the second pressure sensor 32b can detect the static pressure of the air spring 12. When the third opening and closing valve 24c and the fourth opening and closing valve 24d are closed, the vehicle height adjustment valves 14RR and 14RL are closed, and one of the vehicle height adjustment valves 14FR and 14FL is opened, the second pressure sensor 32b can detect the static pressure of any one of the respective air springs 12FR and 12FL of the front wheels. When both of the vehicle height adjustment valves 14FR and 14FL are opened, the second pressure sensor 32b can detect an average static pressure of the air springs 12FR and 12FL. When the third opening and closing valve 24c and the fourth opening and closing valve 24d are closed, the vehicle height adjustment valves 14FR and 14FL are closed, and one of the vehicle height adjustment valves 14RR and 14RL is opened, the second pressure sensor 32b can detect the static pressure of any one of the respective air springs 12RR and 12RL of the rear wheels. When both of the vehicle height adjustment valves 14RR and 14RL are opened, the second pressure sensor 32b can detect an average static pressure of the air springs 12RR and 12RL. When the third opening and closing valve 24c and the fourth opening and closing valve 24d are closed, the vehicle height adjustment valves 14FR, 14FL, 14RR, and 14RL are opened, the second pressure sensor 32b can detect the static pressure of the entirety of the air springs 12FR, 12FL, 12RR, and 12RL that correspond to the entirety of the wheels, respectively. When the third opening and closing valve 24c or the fourth opening and closing valve 24d is opened, the second pressure sensor 32b can detect the dynamic pressure of the air spring 12 (the vehicle height adjustment unit, the front wheel valve unit 18a, and the rear wheel valve unit 18b).

As such, the first pressure sensor 32a can detect the pressure (static pressure or dynamic pressure) of an upstream side (for example, the pressure tank 26) of the circuit valve block 24, and the second pressure sensor 32b can detect the pressure (static pressure or dynamic pressure) of a downstream side (for example, the air spring 12) of the circuit valve block 24. Since the working fluid flows from the pressure tank 26 toward the air spring 12 due to a pressure difference (differential pressure) between the pressure tank 26 and the air spring 12, the vehicle height can be adjusted, which will be described later. In other words, since a small pressure difference does not allow the flow of a sufficient amount of the working fluid for the adjustment of the vehicle height, it is necessary to drive the compressor unit 30. The vehicle height adjustment apparatus 10 can control the driving of the compressor unit 30 using a pressure difference (differential pressure) based on the detected result of the first pressure sensor 32a and the second pressure sensor 32b.

For example, the pressure tank 26 is made of metal or resin, and has a capacity and pressure resistance properties that allow the pressure tank 26 to sufficiently resist against pressure occurring in a flow passage system when a vehicle height adjustment control of the air spring 12 is performed or not. The pressure tank 26 has a relief valve 26b that reduces the internal pressure of a tank main body 26a when the internal pressure is greater than or equal to a set pressure (pressure that is set in advance via testing and the like) due to an unknown reason.

The compressor unit 30 has the following main configurations: the compressor 36 driven by a motor 34; a dryer 38; and a throttle mechanism 40 including an orifice 40a and a check valve 40b. FIG. 1 illustrates an example in which the compressor unit 30 further includes a relief valve 42; check valves 44, 46, and 48; and filters 50 and 52.

When the pressure difference between the pressure tank 26 and the air spring 12 is less than or equal to a predetermined value (value that is set M advance via testing and the like) during the execution of a vehicle height increasing control operation, or the working fluid is drawn (returns back) into the pressure tank 26 from the air spring 12 during the execution of a vehicle height decreasing control operation, the motor 34 operates the compressor 36, and the compressor unit 30 pressure-feeds the working fluid. The vehicle height adjustment apparatus 10 of the embodiment is a closed type apparatus that adjusts the vehicle height by moving the working fluid in the flow passages (air sealed in the flow passages from the very beginning when the vehicle height adjustment apparatus 10 is built) between the pressure tank 26 and the air spring 12. Accordingly, basically, external air may not intrude into the vehicle height adjustment apparatus 10, and the vehicle height adjustment apparatus 10 is not affected by environmental changes such as humidity fluctuations. Accordingly, basically, it is possible to remove the dryer 38 or the throttle mechanism 40 from the closed type apparatus. The working fluid (air) in the apparatus may leak to the outside due to an unknown reason. At this time, the apparatus supplements the working fluid therein by suctioning the atmosphere (external air) from the outside via the filter 52 and the check valve 48. At this time, the atmosphere (external air) may contain moisture (humid air) that adversely affects configuration components of the vehicle height adjustment apparatus 10. For this reason, in the vehicle height adjustment apparatus 10 illustrated in FIG. 1, the dryer 38 and the throttle mechanism 40 are provided downstream of the compressor 36. The dryer 38 removes a predetermined amount of humid air from the suctioned atmosphere, and the throttle mechanism 40 adjusts the passing through speed of the atmosphere that passes through the dryer 38. The compressor unit 30 has the relief valve 42 so as to reduce the internal pressure of the vehicle height adjustment apparatus 10 when the internal pressure exceeds a limit pressure due to an unknown reason. For example, the relief valve 42 has an ON/OFF controlled solenoid and a spring, and a normally closed electro-magnetic control valve that is closed when the solenoid is not energized can be used as the relief valve 42. The relief valve 42 of the embodiment has a check valve 54 that allows the flow of the working fluid to the outside without maintaining a closed state of the non-energized solenoid in any of the cases when the internal pressure of the vehicle height adjustment apparatus 10 exceeds the limit pressure (pressure that is set in advance via testing and the like). For example, when the internal pressure of the vehicle height adjustment apparatus 10 exceeds the limit pressure due to the occurrence of an unknown malfunction, the internal pressure opens the relief valve 42 against a biasing force of the cheek valve 54, and thus the internal pressure is automatically reduced below the limit pressure. The relief valve 42 can be opened based on a control signal from a control unit that will be described later, and thus can reduce the internal pressure of the vehicle height adjustment apparatus 10 regardless of the limit pressure.

In the vehicle height adjustment apparatus 10 with this configuration, a control unit (ECU) 56 of the vehicle height adjustment apparatus 10 controls the vehicle height adjustment unit (the air springs, the vehicle height adjustment valves, and the like which will be described later) to adjust the vehicle height. For example, the ECU 56 can acquire the demand for vehicle height adjustment via a controller area network (CAN); the detected result of a vehicle height sensor 58 that detects an extension and contraction (vehicle height) state of each of the air springs 12; and the detected result of the first pressure sensor 32a and the second pressure sensor 32b. The ECU 56 controls the opening and closing of the vehicle height adjustment valves 14FR, 14FL, 14RR, 14RL, the first opening and closing valve 24a, the second opening and closing valve 24b, the third opening and closing valve 24c, the fourth opening and closing valve 24d, and the relief valve 42, or the driving of the motor 34, based on the acquired information. FIG. 1 illustrates an example in which the single ECU 56 controls each control target in an integrated manner. However, a control unit may be provided to individually control each control target, or some control units may be provided to control several control targets as a group, and an upper control unit may be provided to control the several control units in an integrated manner.

The vehicle height increasing and decreasing control operations of the vehicle height adjustment apparatus 10 with this configuration will be described with reference to FIGS. 2 to 4.

First, in the following description of the operation of the vehicle height adjustment apparatus 10 with reference to FIG. 2, when a vehicle height increasing control operation is performed, the pressure of the pressure tank 26 is sufficiently higher than that of the air spring 12, and the working fluid (air) can flow from the pressure tank 26 toward the air spring 12 due to a pressure difference between the pressure tank 26 and the air spring 12. The ECU 56 acquires the pressure of the pressure tank 26 based on the detected result of the first pressure sensor 32a, and the pressure of the air spring 12 based on the detected result of the second pressure sensor 32b, calculates a pressure difference, and thus determines whether the pressure difference is sufficient enough to allow the flow of the working fluid (air).

When a vehicle height increasing adjustment control operation is performed, a vehicle height adjustment speed is preferably changed based on situations. For example, an operator may want to increase the vehicle height so as to reduce a burden on the occupant in boarding or deboarding from the vehicle. At this time, it is desirable that the increasing of the vehicle height be quickly completed in order for the occupant to be able to board and alight from the vehicle. The operator may preferably want to increase the vehicle height in response to travelling states (speed, road surface conditions, and the like) when the vehicle is travelling. At this time, the operator desirably increases the vehicle height in an increasing speed range in which the occupant is not discomfortable while a stable travelling is maintained.

When the vehicle height adjustment apparatus 10 performs a vehicle height increasing control operation, the ECU 56 controls the opening and closing of the first opening and closing valve 24a, the second opening and closing valve 24b, the third opening and closing valve 24c, and the fourth opening and closing valve 24d of the circuit valve block 24, and the opening of the vehicle height adjustment valves 14FR, 14FL, 14RR, and 14RL.

The vehicle height adjustment apparatus 10 of the embodiment can switch the flow mode (flow direction, flow rate, or the like) of the working fluid by changing the combination of the respective opening and closing states of the first opening and closing valve 24a, the second opening and closing valve 24b, the third opening and closing valve 24c, and the fourth opening and closing valve 24d of the circuit valve block 24. For example, when the working fluid flows from the pressure tank 26 toward the vehicle height adjustment unit (the air spring 12) due to a pressure difference therebetween, the ECU 56 can selectively use at least one of first and second flow passage systems. The first flow passage system is formed when the first opening and closing valve 24a and the fourth opening and closing valve 24d are opened, and the second flow passage system is formed when the second opening and closing valve 24b and the third opening and closing valve 24c are opened. For example, when the ease of flow of a first flow mode (flow passage opening diameter due to the ease of flow associated with flow resistance) of the first flow passage system is actually the same as that of a second flow mode (flow passage opening diameter due to the ease of flow associated with flow resistance) of the second flow passage system, the ECU 56 selects any one of the first and second flow passage systems. At this time, the working fluid flowing out of the pressure tank 26 via the tank connection main flow passage 16b can be supplied to the air spring 12 in a first speed mode (for example, low-speed increasing mode) while passing through the first flow passage system or the second flow passage system, the air spring 12 extends due to the opening of the vehicle height adjustment valve 14, and it is possible to increase the vehicle height at a low speed.

When the ECU 56 selects the first and second flow passage systems, the flow of the working fluid is actually two times easier compared to when the ECU 56 selects any one of the first and second flow passage systems, and the working fluid can be supplied to the air spring 12 in a second speed mode (for example, high-speed increasing mode) faster than in the first speed mode. As a result, the air spring 12 extends due to the opening of the vehicle height adjustment valve 14, and it is possible to increase the vehicle height at a higher speed compared to the first speed mode.

The ECU 56 can switch the ease of flow of the working fluid (flow rate of the working fluid) per a unit time period by selecting the first and/or second flow passage systems, and easily change the vehicle height increasing speed. In another embodiment, the first flow mode of the first flow passage system defined by the opening of the first opening and closing valve 24a and the fourth opening and closing valve 24d may be set differently from the second flow mode of the second flow passage system defined by the opening of the second opening and closing valve 24b and the third opening and closing valve 24c. For example, the opening diameter of the opening and closing valves of the first flow passage system may be different from that of the second flow passage system. As a result, when the ECU 56 opens the first opening and closing valve 24a and the fourth opening and closing valve 24d, and selects the first flow passage system, a speed mode becomes the low-speed increasing mode. When the ECU 56 opens the second opening and closing valve 24b and the third opening and closing valve 24c, and selects the second flow passage system, a speed mode becomes a medium-speed increasing mode. When the ECU 56 selects the first and second flow passage systems, a speed mode becomes the high-speed increasing mode.

The first and/or second flow passage systems may be selected multiple times during one vehicle height increasing process. For example, in an initial period of a vehicle height increasing operation, the increasing speed may be set to the first speed mode in which any one of the first flow passage system and the second flow passage system is selected. In an intermediate period, the increasing speed may be set to the second speed mode in which both of the first and second flow passage systems are selected, and which is faster than the first mode. In a final period, the increasing speed may be set to the first speed mode again. It is possible to reduce a shock at the start of the increasing of the vehicle height by starting the increasing of the vehicle height slowly in the first speed mode. It is possible to reduce a time period it takes to complete the vehicle height increasing control operation by changing a speed mode to the second speed mode in the intermediate period, in which the vehicle height is increased at a high speed. It is possible to reduce a shock at the stop of increasing of the vehicle height by switching a speed mode to the first speed mode again and increasing the vehicle height slowly in the final period.

Figure 2:
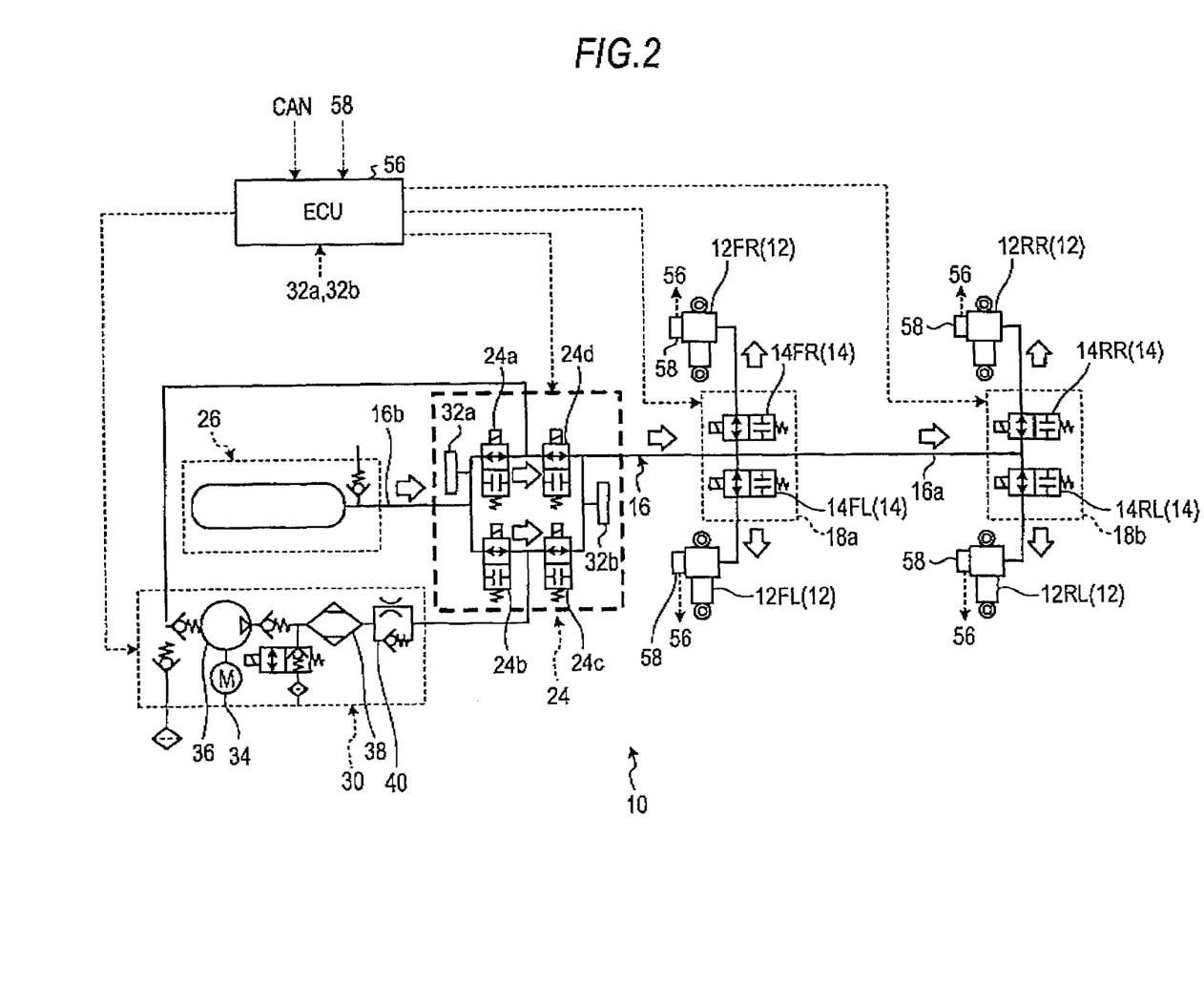
FIG. 2 is a diagram illustrating the state of opening and closing valves and the flow of the working fluid when the vehicle height adjustment apparatus of the embodiment performs a vehicle height increasing control operation without a compressor being driven.

As illustrated in FIG. 2 and the like, in the vehicle height adjustment apparatus 10 of the embodiment, the second end of the second opening and closing valve 24b and the first end of the third opening and closing valve 24c are connected to the throttle mechanism 40, and the second end of the second opening and closing valve 24b is also connected to the first end of the third opening and closing valve 24c. That is, when the working fluid flows toward the air spring 12 due to a pressure difference between the pressure tank 26 and the air spring 12, regardless of the throttle mechanism 40, that is, the compressor unit 30, the working fluid can pass through any one or both of the first flow passage system formed in the first opening and closing valve 24a and the fourth opening and closing valve 24d and the second flow passage system formed in the second opening and closing valve 24b and the third opening and closing valve 24c. In other words, when the working fluid flows due to the pressure difference, the working fluid does not pass through the compressor unit 30. Accordingly, it is possible to simplify the flow passage of the working fluid that flows due to the pressure difference, and reduce the occurrence of pressure loss during the flow of the working fluid.

In the vehicle height adjustment apparatus 10, basically, the working fluid flows toward the air spring 12 due to a pressure difference between the pressure tank 26 and the air spring 12. However, since the working fluid flows from the pressure tank 26 toward the air spring 12, the pressure difference between the pressure tank 26 and the air spring 12 may dissipate so as not to allow a sufficient flow of the working fluid. In addition, there may not be present a sufficient pressure difference (differential pressure) between the pressure tank 26 and the air spring 12 when a vehicle height increasing control operation is started. At this time, the ECU 56 drives the motor 34 of the compressor unit 30, and the compressor 36 forcibly draws the working fluid from the pressure tank 26, and pressure-feeds the working fluid toward the air spring 12.

Figure 3:
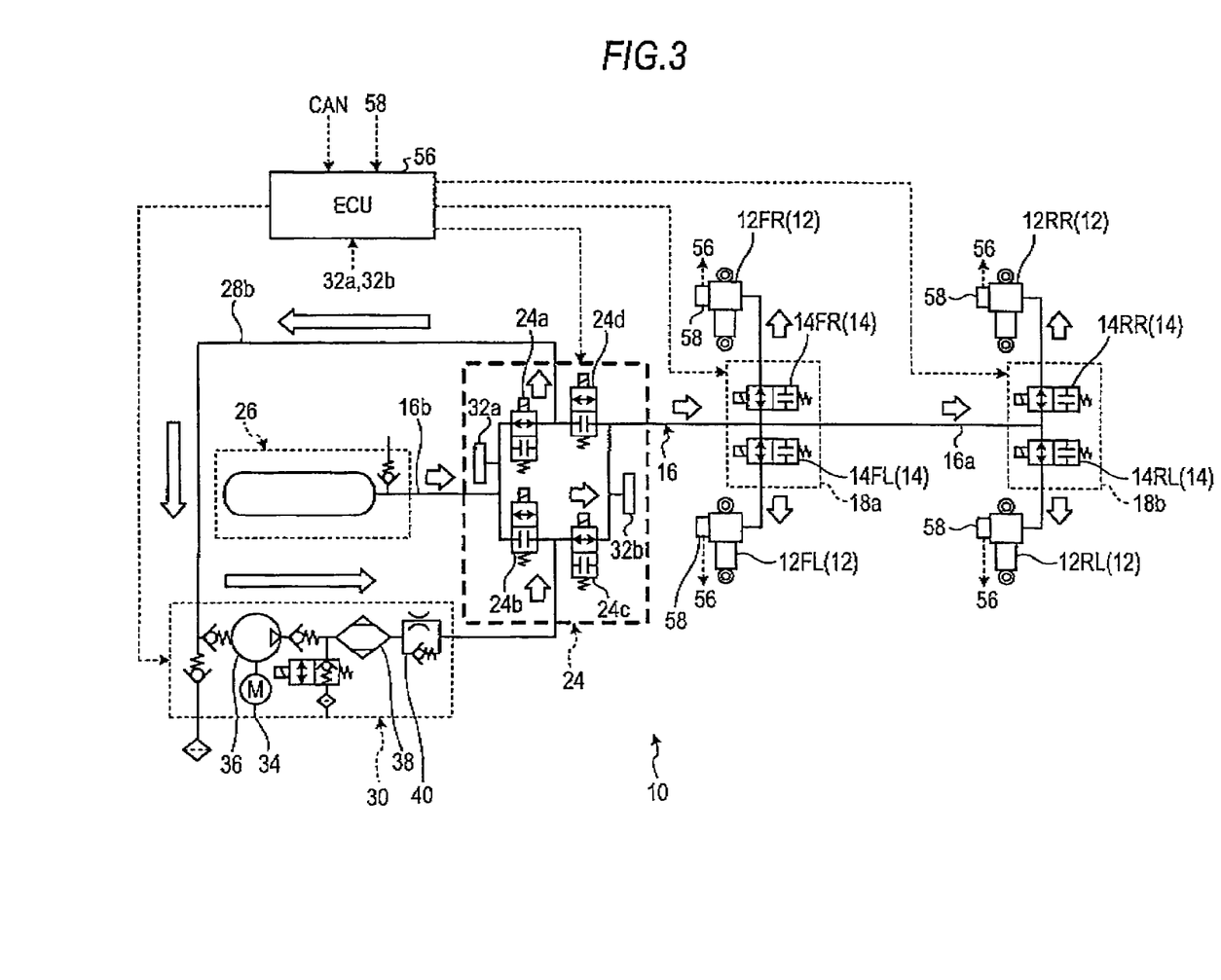
FIG. 3 is a diagram illustrating the state of opening and closing valves and the flow of the working fluid when the vehicle height adjustment apparatus of the embodiment performs a vehicle height increasing control operation with the compressor being driven.

In the operation of the vehicle height adjustment apparatus 10 illustrated in FIG. 3, when a vehicle height increasing control operation is performed, the compressor 36 pressure-feeds the working fluid toward the air spring 12. For example, when it is determined that a pressure difference between the pressure tank 26 and the air spring 12 is less than or equal to a predetermined value, based on the detected results of the first pressure sensor 32a and the second pressure sensor 32b, the ECU 56 switches the respective opening and closing states of the first opening and closing valve 24a, the second opening and closing valve 24b, the third opening and closing valve 24c, and the fourth opening and closing valve 24d, and controls the compressor 36 to start the pressure feed of the working fluid. It is possible to determine the predetermined value for the pressure difference to trigger the switching of the opening and closing states, based on via testing carried out in advance and the like. For example, it is possible to determine a differential pressure value in such a manner that the vehicle height increasing speed becomes less than the predetermined value. At this time, it is desirable that the compressor 36 start the pressure feed of the working fluid before the increasing of the vehicle height is stopped.

In another embodiment, the compressor 36 may start the pressure feed of the working fluid based on the detected result of the vehicle height sensors 58. That is, when a pressure difference between the pressure tank 26 and the air spring 12 decreases, the vehicle height increasing speed decreases as well. Accordingly, the ECU 56 may calculate the vehicle height increasing speed by time-differentiating a vehicle height value from each of the vehicle height sensors 58, and when the vehicle height increasing speed is less than or equal to a predetermined value (low increasing speed limit determined in advance via testing and the like), the ECU 56 may control the compressor 36 to start the pressure feed of the working fluid. The ECU 56 may determine a start of driving of the compressor 36 based on the detected results of the first pressure sensor 32a and the second pressure sensor 32b and the detected result of the vehicle height sensor 58.

As illustrated in FIG. 3, when a pressure difference is less than or equal to the predetermined value based on the detected results of the first pressure sensor 32a and the second pressure sensor 32b, or when the vehicle height increasing speed is less than or equal to the predetermined value based on the detected vehicle height value of each of the vehicle height sensors 58, the ECU 56 brings the first opening and closing valve 24a into an opening state, and the fourth opening and closing valve 24d into a closing state. At this time, the pressure tank 26 and the compressor 36 are brought into communication with each other. The second opening and closing valve 24b is closed, and the third opening and closing valve 24c is opened. At this time, the compressor 36 and the air spring 12 are brought into communication with each other. As a result, the working fluid in the pressure tank 26 is drawn into the compressor 36 via the tank connection main flow passage 16b, the first opening and closing valve 24a, and the compressor inlet flow passage 28b by the driving of the compressor 36. The drawn working fluid is compressed, and pressure-fed toward the air spring 12 via the compressor outlet flow passage 28a and the third opening and closing valve 24c. As a result, the air spring 12 can be controlled to increase the vehicle height even when there is no sufficient pressure difference between the pressure tank 26 and the air spring 12. At this time, the vehicle height increasing speed is determined by the output of the compressor 36, that is, the output of the motor 34. For this reason, the ECU 56 controls the output of the motor 34 in response to a demanded vehicle height increasing speed, for example, a high-speed vehicle height increasing demand or a low-speed vehicle height increasing demand. Even when the vehicle height increasing speed is changed multiple times in one vehicle height increasing process as described above, the ECU 56 preferably controls the output of the motor 34.

When there is present a pressure difference between the pressure tank 26 and the air spring 12, but the weight of the vehicle is increased before or while a vehicle height increasing control operation is performed, for example, when the number of occupants increases, or when the amount of cargo increases, a load which the air spring 12 has to support increases, thereby contracting the air spring 12. As a result, the pressure of the air spring 12 increases, and a pressure difference (differential pressure) between the pressure tank 26 and the air spring 12 may dissipate. Even in this case, the vehicle height increasing speed decreases. It is possible to detect these conditions based on the detected values of the first pressure sensor 32a and the second pressure sensor 32b or of the vehicle height sensor 58. Accordingly, the ECU 56 can control the compressor 36 to start the pressure feed of the working fluid at an appropriate time.

Subsequently, the operation of the vehicle height adjustment apparatus 10 during the execution of a vehicle height decreasing control operation will be described with reference to FIG. 4. For example, when acquiring a vehicle height decreasing demand via the CAN, the ECU 56 switches the opening and closing states of the first opening and closing valve 24a, the second opening and closing valve 24b, the third opening and closing valve 24c, and the fourth opening and closing valve 24d. As a result, it is possible to draw the working fluid from the air spring 12, and return the working fluid back to the pressure tank 26 (pressure-feed the working fluid toward the pressure tank 26), using the compressor 36, and it is possible to contract the air spring 12, and decrease the vehicle height.

Figure 4:
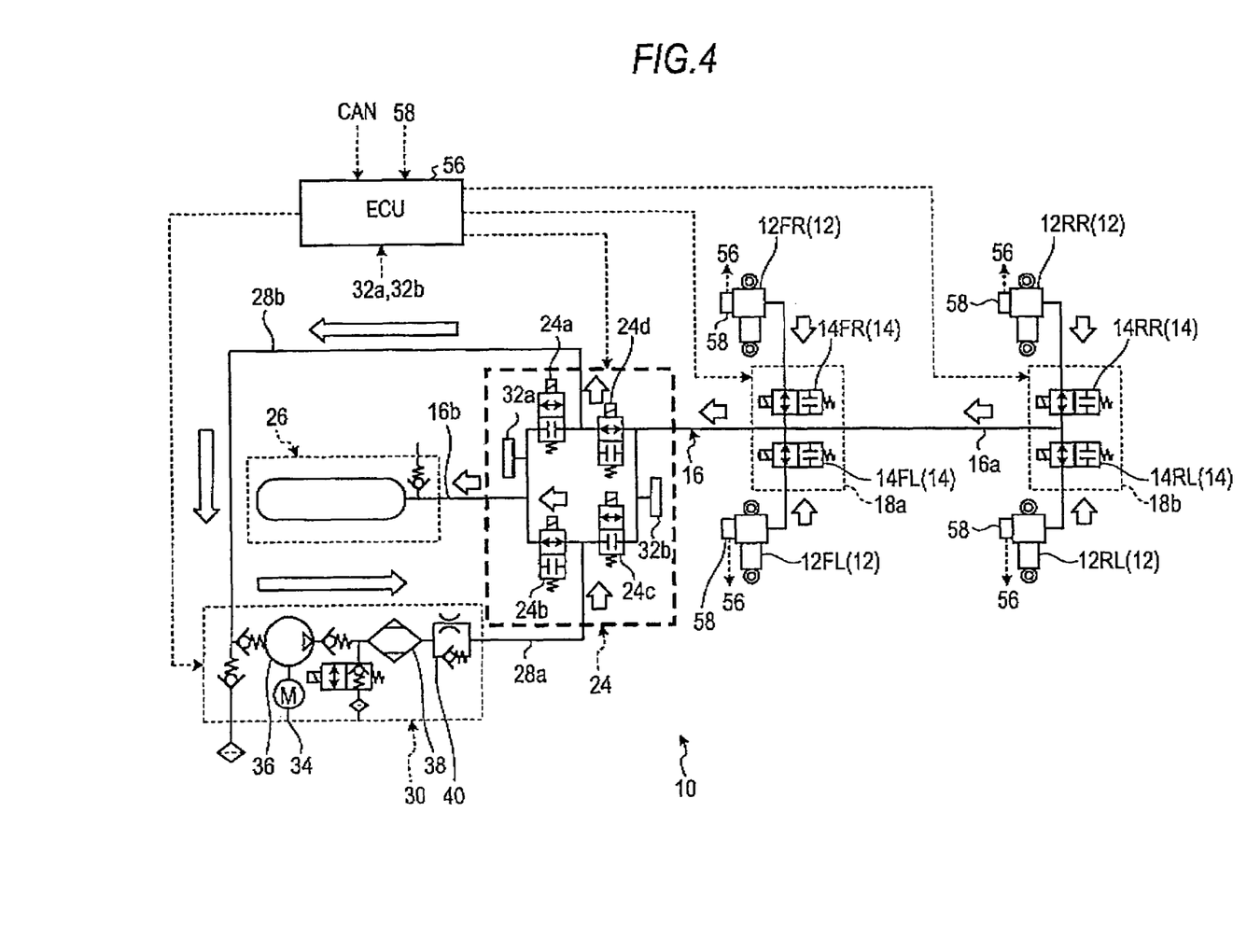
FIG. 4 is a diagram illustrating the state of opening and closing valves and the flow of the working fluid when the vehicle height adjustment apparatus of the embodiment performs a vehicle height decreasing control operation with the compressor being driven.

As illustrated in FIG. 4, when a vehicle height decreasing control operation is performed, the ECU 56 brings the first opening and closing valve 24a into a closing state, and the fourth opening and closing valve 24d into an opening state. The second opening and closing valve 24b is opened, and the third opening and closing valve 24c is maintained closed. The vehicle height adjustment valves 14FR, 14FL, 14RR, and 14RL are opened. As a result, the air spring 12 and the compressor 36 are brought into communication with each other via the fourth opening and closing valve 24d and the compressor inlet flow passage 28b. The outlet of the compressor 36 communicates with the pressure tank 26 via the compressor outlet flow passage 28a, the second opening and closing valve 24b, and the tank connection main flow passage 16b. The working fluid of the air spring 12 is drawn and pressure-fed to the pressure tank 26 by the compressor 36.

When a vehicle height decreasing control operation is performed, the vehicle height decreasing speed depends on a speed at which the working fluid is drawn by the compressor 36. That is, since the ECU 56 can arbitrarily adjust the output of the motor 34, the ECU 56 can arbitrarily select the vehicle height decreasing speed. Accordingly, the ECU 56 increases the output of the motor 34 when it is necessary to increase the vehicle height decreasing speed, and the ECU 56 decreases the output of the motor 34 when it is necessary to decrease the vehicle height decreasing speed. For example, when the occupants including a driver parks (stops) the vehicle, and move away from the vehicle, the ECU 56 may notify the occupants of the fact that the vehicle is in a resting state. At this time, it is possible to demonstrate that the vehicle comes into a resting state by itself by quickly decreasing the vehicle height lower than a normal vehicle height in a period in which the occupants including the driver stay in the vicinity of the vehicle, for example, for a few seconds after the driver turns off a drive source of the vehicle, alight from the vehicle, and lock the doors. It is possible to decrease the vehicle height in a speed range in which the occupant does not have the discomfort while a stable travelling is maintained, when stable travelling can be obtained by decreasing the vehicle height during the travelling.

The ECU 56 can adjust the amount of decreasing of the vehicle height by controlling a drive period of the compressor 36. For example, when the occupants including a driver park (stop) the vehicle, and move away from the vehicle, it is possible to demonstrate that the silhouette of the vehicle while being parked or stopped looks beautiful by decreasing the vehicle height. It is possible to prevent the theft of the wheels or the theft of the vehicle by decreasing the vehicle height. When the vehicle height decreasing control operation is performed, a sensor or the like preferably detects obstacles under the bottom surface of the vehicle and at the surroundings thereof in such a manner that the vehicle does not become damaged.

When the compressor 36 is driven to pressure feed the working fluid, and then is stopped as described above, a large pressure difference between the forward and rearward pressure tubes (the compressor outlet flow passage 28a and the compressor inlet flow passage 28b) of the pressure tank 26 and the compressor 36 may be maintained. When the circuit valve block 24 is controlled at a subsequent control timing in this state, in particular, when the first opening and closing valve 24a is controlled, it may be difficult to open the first opening and closing valve 24a due to the pressure difference between the forward and rearward pressure tubes of the compressor 36.

Hereinafter, a specific example will be given. As illustrated in FIG. 3, when the vehicle height increasing control operation is performed using the working fluid pressure-fed by the compressor 36, and the vehicle height reaches a target vehicle height, the ECU 56 stops the vehicle height increasing control operation. That is, the first opening and closing valve 24a, the second opening and closing valve 24b, the third opening and closing valve 24c, and the fourth opening and closing valve 24d of the circuit valve block 24 are not energized, and are closed via a command from the ECU 56.

The compressor 36 is also stopped. At this time, when the first opening and closing valve 24a is closed prior to the stop of the compressor 36 due to unknown reasons, the working fluid remaining in the compressor inlet flow passage 28b (back pressure side of the compressor 36) is drawn by the compressor 36, and the pressure of the compressor inlet flow passage 28b decreases extremely. Even when the ECU 56 simultaneously sends out a stop command to the first opening and closing valve 24a, the second opening and closing valve 24b, the third opening and closing valve 24c, and the fourth opening and closing valve 24d of the circuit valve block 24, and the compressor 36, there may exist a delay in stopping the rotation of the compressor 36 due to the inertia of the motor 34. At this time, after the opening and closing valves of the circuit valve block 24 are closed, the working fluid may be continuously drawn by the compressor 36 for some time, and the pressure of the compressor inlet flow passage 28b decreases extremely.

A first end of the first opening and closing valve 24a is connected to the pressure tank 26 in a high pressure state via the tank connection main flow passage 16b, and a second end of the first opening and closing valve 24a is connected to the compressor inlet flow passage 28b in an extremely low pressure state. As a result, when the first opening and closing valve 24a is opened at a subsequent control timing, it is necessary to provide a drive force large enough to overcome a large pressure difference between both ends of the first opening and closing valve 24a, and to switch the opening and closing state of the first opening and closing valve 24a. In other words, this may cause a delay in open control or an operational malfunction of the first opening and closing valve 24a depending on the magnitude of the drive force for the first opening and closing valve 24a.

For example, it is assumed that the opening and closing valves of the circuit valve block 24 are closed, and the overdrive of the compressor 36 causes the relative pressure value of the compressor outlet flow passage 28a to be "0.7", and the relative pressure value of the compressor inlet flow passage 28b (back pressure side of the compressor 36) to be "0". When the relative pressure value of the pressure tank 26 is "1.5", a pressure difference between both ends of the first opening and closing valve 24a becomes a relative value of "1.5", and it is necessary to provide a large drive force for open control of the first opening and closing valve 24a. When the pressure of the compressor inlet flow passage 28b (back pressure side of the compressor 36) becomes negative, it is necessary to provide a greater drive force.

The same phenomenon occurs even when the vehicle height decreasing operation is performed. As illustrated in FIG. 4, when the vehicle height decreasing control operation is performed using the working fluid pressure-fed by the compressor 36, and the vehicle height reaches a target vehicle height, the ECU 56 stops the vehicle height decreasing control operation. That is, the first opening and closing valve 24a, the second opening and closing valve 24b, the third opening and closing valve 24c, and the fourth opening and closing valve 24d of the circuit valve block 24 are not energized, and are closed via a command from the ECU 56. The compressor 36 is also stopped. At this time, when the fourth opening and closing valve 24d is closed prior to the stop of the compressor 36 due to unknown reasons, the working fluid remaining in the compressor inlet flow passage 28b (back pressure side of the compressor 36) is drawn by the compressor 36, and the pressure of the compressor inlet flow passage 28b decreases extremely. Even when the ECU 56 simultaneously sends out a stop command to the first opening and closing valve 24a, the second opening and closing valve 24b, the third opening and closing valve 24c, and the fourth opening and closing valve 24d of the circuit valve block 24, and the compressor 36, there may exist a delay in stopping the rotation of the compressor 36 due to the inertia of the motor 34. At this time, after the opening and closing valves of the circuit valve block 24 are closed, the working fluid may be continuously drawn by the compressor 36 for some time, and the pressure of the compressor inlet flow passage 28b decreases extremely.

Figure 5:
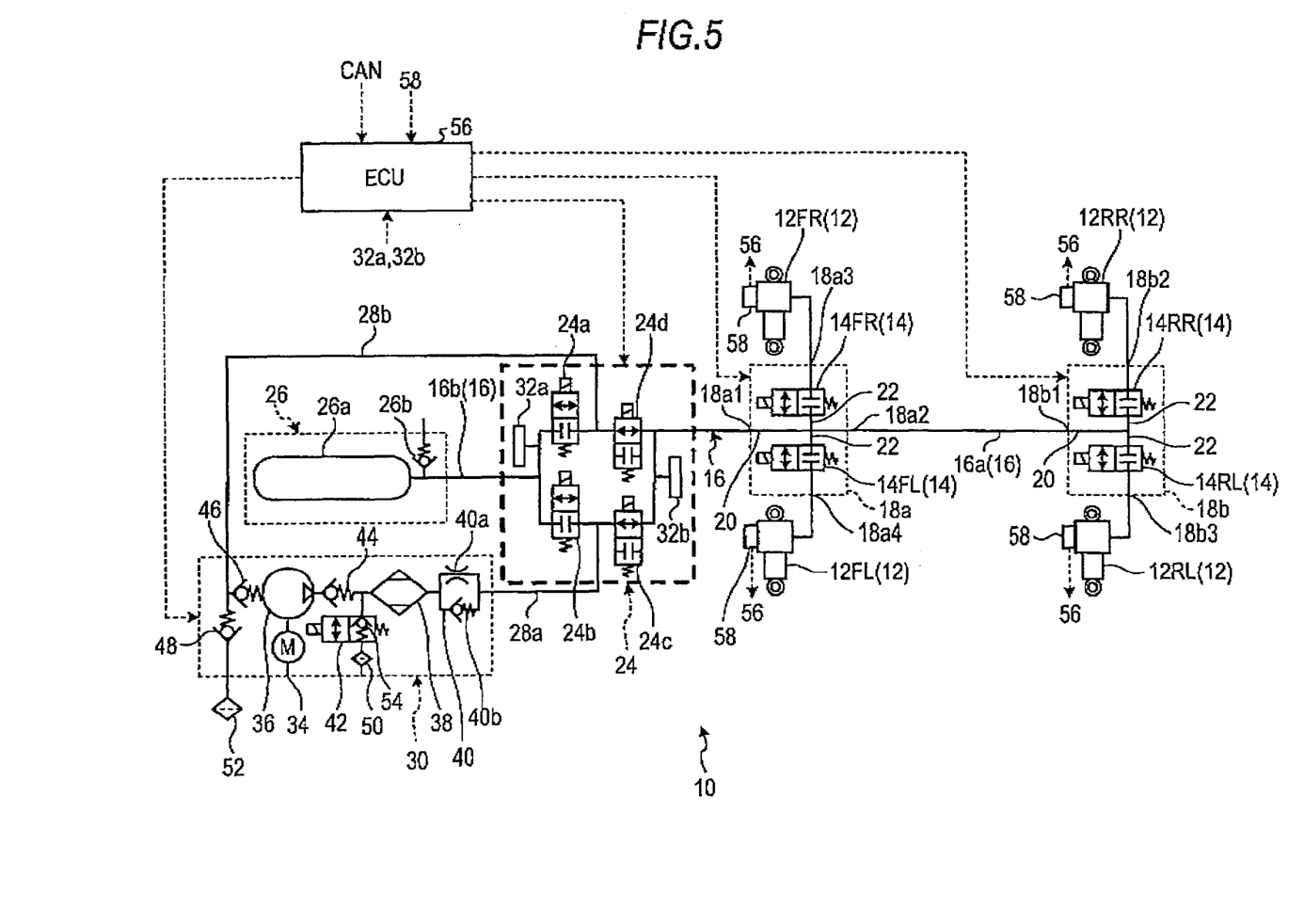
FIG. 5 is a diagram illustrating the control state of the opening and closing valves of the circuit valve block when the vehicle height adjustment apparatus of the embodiment performs a refresh control operation.

Upon the completion of the pressure feed of the working fluid by the compressor 36, the vehicle height adjustment apparatus 10 of the embodiment performs a refresh control operation for reducing a large pressure difference between both ends of the first opening and closing valve 24a. Specifically, after the state of the compressor 36 transits from an operation state (ON state) to a non-operation state (OFF state), as illustrated in FIG. 5, when a predetermined control delay period elapses, the third opening and closing valve 24c and the fourth opening and closing valve 24d are opened for only a predetermined time. As a result, the compressor outlet flow passage 28a and the compressor inlet flow passage 28b are communicated with each other, and the pressure of the outlet of the compressor 36, which is high due to the overdrive of the compressor 36, becomes the same as that of the compressor inlet flow passage 28b (back pressure side of the compressor 36), which is extremely low due to the overdrive of the compressor 36.

For example, as described above, when the relative pressure value of the compressor outlet flow passage 28a is "0.7" due to the overdrive of the compressor 36, the relative pressure value of the compressor inlet flow passage 28b (back pressure side of the compressor 36) also becomes substantially "0.7" by performing the refresh control operation of opening the third opening and closing valve 24c and the fourth opening and closing valve 24d for the predetermined time. As a result, a pressure difference between the relative pressure value "1.5" of the pressure tank 26 and the relative pressure value of each of the compressor outlet flow passage 28a and the compressor inlet flow passage 28b becomes "0.8". That is, a pressure difference between both ends of the first opening and closing valve 24a becomes a relative value of "0.8", and compared to when the refresh control operation is not performed, it is possible to reduce a moving force for opening the first opening and closing valve 24a.

As a result, it is possible to smoothly control the first opening and closing valve 24a, and it is possible to satisfactorily perform the vehicle height adjustment control operation at a subsequent control timing after the compressor 36 is stopped. Since it is possible to reduce a pressure difference between both ends of the first opening and closing valve 24a, it is possible to reduce a force of opening the first opening and closing valve 24a. It is possible to design the opening and closing valve for a small size, reduce costs, and improve mounting properties.

Since it is possible to make the pressure substantially the same between the compressor outlet flow passage 28a and the compressor inlet flow passage 28b of the compressor 36, it is possible to decrease starting torque at the re-starting of the compressor 36. That is, it is possible to reduce the size or cost of the motor 34, and this control strategy is beneficial from a design perspective. As described above, since a pressure difference is reduced not by adjusting the pressure of the pressure tank 26 but by operating the pressure of the air spring 12, and thus making the pressure the same between the compressor outlet flow passage 28a and the compressor inlet flow passage 28b, this control strategy is beneficial to designing the opening and closing valve and the compressor 36. As a result, it is possible to reduce the cost of the vehicle height adjustment apparatus 10 and improve mounting properties by reducing the size of the vehicle height adjustment apparatus 10.

Figure 6:
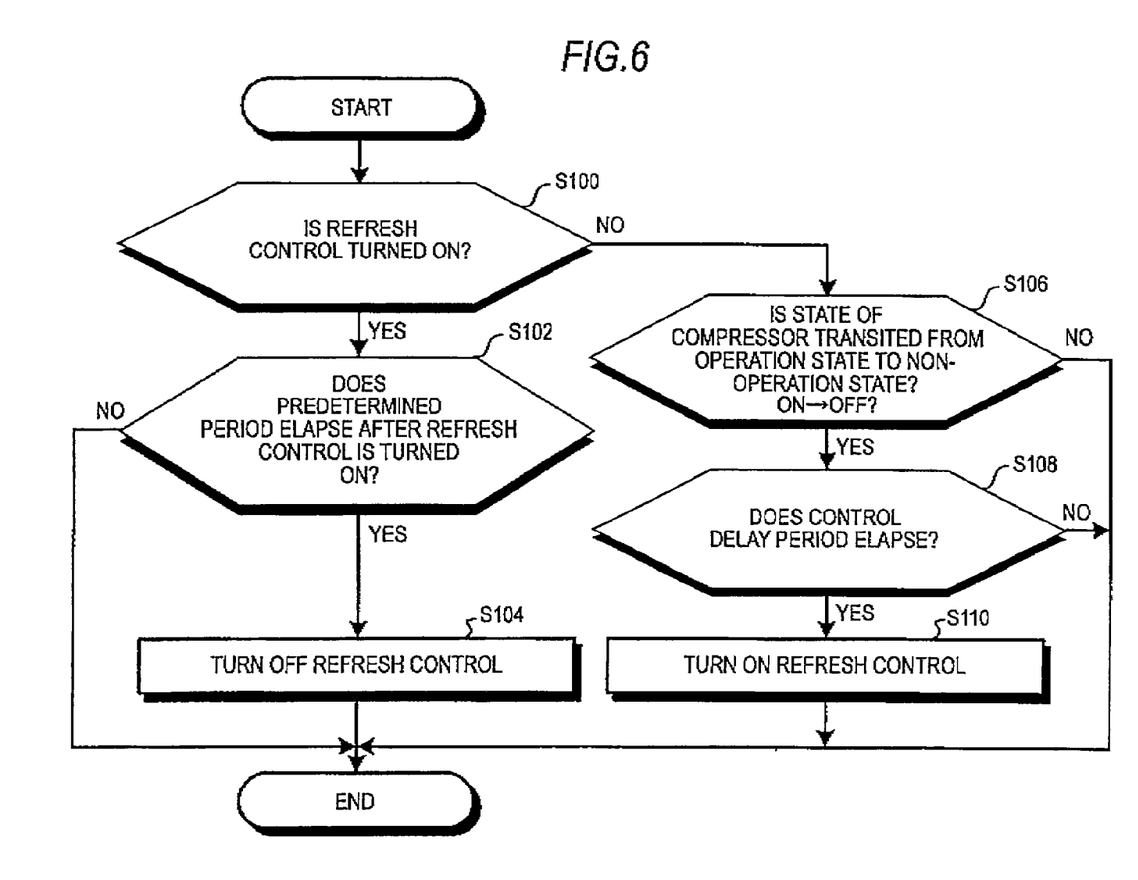
FIG. 6 is a flowchart illustrating the refresh control operation of the vehicle height adjustment apparatus of the embodiment.

FIG. 6 is a flowchart illustrating the refresh control operation of the vehicle height adjustment apparatus 10. The ECU 56 executes a control operation for a predetermined control period as per the flowchart in FIG. 6. The ECU 56 determines whether the refresh control operation is currently underway (ON), based on the control state of the circuit valve block 24, and when the refresh control operation is ON (Y in S100), the ECU 56 determines whether a predetermined period (for example, one second) or greater elapses after the start of the refresh control operation. When the predetermined period does not elapse after the start of the refresh control operation (N in S102), the ECU 56 ends this process, and restarts a process from S100 for a subsequent control period. That is, the ECU 56 continuously performs the refresh control operation for opening the third opening and closing valve 24*c* and the fourth opening and closing valve 24*d*, and reduces (controls) a pressure difference between forward and rearward sides of the first opening and closing valve 24*a* and between forward and rearward sides of the compressor 36.

In contrast, when the predetermined period elapses after the start of the refresh control operation in S102 (Y in S102), the ECU 56 stops (OFF) the refresh control operation (S104), ends this process, and restarts a process from S100 for a subsequent control period. That is, the control operation is performed to close the third opening and closing valve 24*c* and the fourth opening and closing valve 24*d*.

When the refresh control operation is not currently underway (ON) in S100 (N in S100), when the state of the compressor 36 does not transit from the operation state (ON state) to the non-operation state (OFF state) (N in S106), the ECU 56 ends this process without executing the refresh control operation, and restarts a process from S100 for a subsequent control period.

When the state of the compressor 36 transits from the operation state (ON state) to the non-operation state (OFF state) in S106 (Y in S106), and after the transition, the predetermined control delay period (for example, one second) elapses (Y in S108), the ECU 56 executes (ON) the refresh control operation (S110). That is, the control operation is performed to open the third opening and closing valve 24*c* and the fourth opening and closing valve 24*d*. As a result, the compressor outlet flow passage 28*a* and the compressor inlet flow passage 28*b* are communicated with each other, and even when the overdrive of the compressor 36 causes an increase in pressure, the pressure of the outlet of the compressor 36 becomes substantially the same as that of the compressor inlet flow passage 28*b* (back pressure side of the compressor 36) in an extremely low pressure state.

When the control delay period does not elapse in S108 (N in S108), the ECU 56 ends this process without executing the refresh control operation, and restarts a process from S100 for a subsequent control period. Accordingly, when the compressor 36 temporarily stops the pressure feed of the working fluid, it is possible to prevent the refresh control operation from being excessively executed, and prevent the movement of vehicle height adjustment from being unnatural.

As such, in the vehicle height adjustment apparatus 10 of the embodiment, it is possible to smoothly open the first opening and closing valve 24*a* by reducing a pressure difference between the pressure tank 26 and the compressor inlet flow passage 28*b* when the first opening and closing valve 24*a* is opened. At this time, since the pressure of the compressor outlet flow passage 28*a* becomes substantially the same as that of the compressor inlet flow passage 28*b* in the compressor 36, it is possible to decrease starting torque at the re-starting of the compressor 36.

The vehicle height adjustment apparatus 10 of the embodiment includes a total of four of the first opening and closing valve 24*a*, the second opening and closing valve 24*b*, the third opening and closing valve 24*c*, and the fourth opening and closing valve 24*d*, and switches the flow passage of the working fluid. As illustrated in FIGS. 1 to 4, each of the first opening and closing valve 24*a*, the second opening and closing valve 24*b*, the third opening and closing valve 24*c*, and the fourth opening and closing valve 24*d* can adopt a two-port opening and closing valve that has a simple configuration and is relatively cheap. As illustrated in FIGS. 2 to 4, it is possible to switch the flow mode (flow passage or flow direction) of the working fluid by changing the combination of the respective opening and closing states of the first opening and closing valve 24*a*, the second opening and closing valve 24*b*, the third opening and closing valve 24*c*, and the fourth opening and closing valve 24*d*, and obtain a cost reduction or a simplified design of the flow passage.

The embodiment illustrates the example in which when the vehicle height increasing control operation is performed, the ECU 56 selects at least one of the first and second flow passage systems, the first flow passage system being formed when the first opening and closing valve 24*a* and the fourth opening and closing valve 24*d* are opened, and the second flow passage system being formed when the second opening and closing valve 24*b* and the third opening and closing valve 24*c* are opened. In another embodiment, when the vehicle height increasing control operation is performed, the ECU 56 may use both of the first and second flow passage systems at all times. At this time, it is possible to improve the ease of flow of the working fluid, increase the vehicle height increasing speed compared to the case in which any one of the first and second flow passage systems is selected, and quickly adjust the vehicle height. It is not necessary to selectively control the opening and closing valves of the circuit valve block 24 when the vehicle height increasing control operation is performed, and a control logic becomes simplified.

In the example illustrated in each of the embodiments, when the vehicle height adjustment control operation (increasing control operation or decreasing control operation) is performed, the vehicle height adjustment apparatus 10 increases or decreases the air springs 12 simultaneously, but the air springs 12 may be adjusted by individually controlling the respective vehicle height adjustment valves 14. For example, when the working fluid is supplied with the rear wheel valve unit 18*b* being closed and the front wheel valve unit 18*a* being opened, it is possible to adjust the vehicle height for only the front wheels via the respective air springs 12FR and 12FL of the front wheels. Similarly, when the working fluid is supplied with the front wheel valve unit 18*a* being closed and the rear wheel valve unit 18*b* being opened, it is possible to adjust the vehicle height for only the rear wheels via the respective air springs 12RR and 12RL of the rear wheels. When the working fluid is supplied with the vehicle height adjustment valves 14FR and 14RR being opened and the vehicle height adjustment valves 14FL and 14RL being closed, it is possible to adjust the vehicle height for only the respective air springs 12FR and 12RR of the right wheels. In contrast, when the working fluid is supplied with the vehicle height adjustment valves 14FL and 14RL being opened and the vehicle height adjustment valves 14FR and 14RR being closed, it is possible to adjust the vehicle height for only the respective air springs 12FL and 12RL of the left wheels. Even at this time, since it is possible to adjust the vehicle height adjustment speed by the selection of the first flow passage system and/or the second flow passage system of the circuit valve block 24, it is possible to obtain the same effects as when the vehicle height is simultaneously adjusted for the four wheels.

The embodiment illustrates the closed type vehicle height adjustment apparatus 10. However, this disclosure can also be applied to substantially the same apparatus, for example, an apparatus that suctions the atmosphere (external air), compresses the atmosphere using the compressor 36, and supplies the atmosphere to the air spring 12 via the pressure tank 26, and it is possible to obtain the same effects.

An aspect of this disclosure is directed to a vehicle height adjustment apparatus including a plurality of vehicle height adjustment units that are respectively provided to correspond to wheels of a vehicle body, and adjust a vehicle height in response to the supply and discharge of a working fluid; a pressure tank that stores the working fluid; a compressor that pressure-feeds the working fluid; a valve body block that is formed by a plurality of opening and closing valves, and is interposed between the pressure tank and the compressor, and the vehicle height adjustment units; and a control unit that adjusts a vehicle height for each of the vehicle height adjustment units by controlling the valve body block. The valve body block is connected to the pressure tank, and is connected to a working fluid outlet and a working fluid inlet of the compressor. Upon the completion of the pressure feed of the working fluid by the compressor, the control unit controls the opening and closing valves in such a manner that the working fluid outlet and the working fluid inlet are communicated with each other. According to the aspect of this disclosure, when the pressure feed of the working fluid by the compressor is completed, the working fluid outlet and the working fluid inlet of the compressor are communicated with each other, and thus the pressure of the working fluid outlet becomes the same as that of the working fluid inlet. As a result, a pressure difference between forward and rearward sides of the pressure tank and the compressor decreases, and a pressure difference between the pressure tank and the valve body block decreases, and thus it is possible to smoothly open and close the opening and closing valves of the valve body block.

In the vehicle height adjustment apparatus according to the aspect of this disclosure, when a predetermined period elapses after the completion of the pressure feed of the working fluid by the compressor, the control unit may communicate the working fluid outlet with the working fluid inlet. According to the aspect of this disclosure, when the compressor temporarily stops the pressure feed of the working fluid, an excessive control operation to communicate the working fluid outlet with the working fluid inlet is prevented. That is, an unnecessary control operation is prevented, and the complexity of control is prevented.

In the vehicle height adjustment apparatus according to the aspect of this disclosure, the plurality of opening and closing valves may include first and second opening and closing valves, a first end of each of which is connected to the pressure tank; a third opening and closing valve, a first end of which is connected to an outlet of the compressor and a second end of the second opening and closing valve, and a second end of which is connected to the vehicle height adjustment unit; and a fourth opening and closing valve, a first end of which is connected to an inlet of the compressor and a second end of the first opening and closing valve, and a second end of which is connected to the vehicle height adjustment unit. Upon the completion of the pressure feed of the working fluid by the compressor, the control unit may open the third and fourth opening and closing valves. According to the aspect of this disclosure, it is possible to reduce a pressure difference between the forward and rearward tubes of the pressure tank and compressor, and it is possible to smoothly open and close the opening and closing valves of the valve body block.

In the vehicle height adjustment apparatus according to the aspect of this disclosure, when the working fluid flows from the pressure tank to the vehicle height adjustment unit due to a pressure difference therebetween, the control unit may select at least one of a first flow passage system that is formed when the first and fourth opening and closing valves are opened, and a second flow passage system that is formed when the second and third opening and closing valves are opened. According to the aspect of this disclosure, while smoothly opening and closing the opening and closing valves of the valve body block, it is possible to switch the ease of flow of the working fluid (flow rate of the working fluid) per unit time period by selecting the first flow passage system or the second flow passage system, or selecting both of the first and second flow passage systems, and it is possible to increase and decrease a vehicle height increasing speed or switch the vehicle height increasing speed by switching the opening and closing states of the opening and closing valves.

In the vehicle height adjustment apparatus according to the aspect of this disclosure, when the working fluid flows from the pressure tank toward the vehicle height adjustment unit due to a pressure difference therebetween, the control unit may use a first flow passage system that is formed when the first and fourth opening and closing valves are opened, and a second flow passage system that is formed when the second and third opening and closing valves are opened. According to the aspect of this disclosure, while smoothly opening and closing the opening and closing valves of the valve body block, it is possible to improve the ease of flow of the working fluid (flow rate of the working fluid) per unit time period, and perform a rapid vehicle height increasing control operation by using both of the first and second flow passage systems.

In the vehicle height adjustment apparatus according to the aspect of this disclosure, a fluid regeneration apparatus and a throttle mechanism may be disposed at the outlet of the compressor, and the second end of the second opening and closing valve and the first end of the third opening and closing valve may be connected to each other and the throttle mechanism. According to the aspect of this disclosure, even in a case where the opening and closing valves of the valve body block are smoothly opened and closed, and in contrast, the fluid regeneration apparatus is disposed in the flow passage to maintain the quality of the working fluid, when the working fluid flows from the pressure tank toward the vehicle height adjustment unit due to a pressure difference therebetween, the working fluid can flow from the second opening and closing valve toward the third opening and closing valve without passing through the fluid regeneration apparatus and the throttle mechanism at the outlet of the compressor which is one of the causes of pressure loss. As a result, it is possible to prevent a decrease in the vehicle height adjustment speed.

The embodiment and modification examples of this disclosure are described, but are presented just as examples, and are not intended to limit the scope of this disclosure. This new embodiment can be implemented in various forms, and omission, replacement, and changes can be made to this disclosure in various forms insofar as the omission, the replacement, and the changes do not depart from the scope of this disclosure. The embodiment or the modifications are included in the scope or the essentials of this disclosure, and included in this disclosure disclosed in the claims and the equivalent range thereof.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vehicle height adjustment apparatus comprising:
   a plurality of vehicle height adjustment units that are respectively provided to correspond to wheels of a vehicle body, and adjust a vehicle height in response to supply and discharge of a working fluid;
   a pressure tank that stores the working fluid;
   a compressor that pressure-feeds the working fluid;
   a valve body block that is formed by a plurality of opening and closing valves, and is interposed between the pressure tank and the compressor, and the vehicle height adjustment units; and
   a control unit that adjusts a vehicle height for each of the vehicle height adjustment units by controlling the valve body block, wherein
   the valve body block is connected to the pressure tank, and is connected to a working fluid outlet and a working fluid inlet of the compressor, and
   upon the completion of pressure feed of the working fluid by the compressor, the control unit controls the opening and closing valves in such a manner that the working fluid outlet and the working fluid inlet of the compressor are communicated with each other.

2. The vehicle height adjustment apparatus according to claim 1,
   wherein when a predetermined period elapses after the completion of the pressure feed of the working fluid by the compressor, the control unit communicates the working fluid outlet with the working fluid inlet of the compressor.

3. The vehicle height adjustment apparatus according to claim 1, wherein
   the plurality of opening and closing valves include first and second opening and closing valves, a first end of each of which is connected to the pressure tank; a third opening and closing valve, a first end of which is connected to an outlet of the compressor and a second end of the second opening and closing valve, and a second end of which is connected to the vehicle height adjustment unit; and a fourth opening and closing valve, a first end of which is connected to an inlet of the compressor and a second end of the first opening and closing valve, and a second end of which is connected to the vehicle height adjustment unit, and
   upon the completion of the pressure feed of the working fluid by the compressor, the control unit opens the third and fourth opening and closing valves.

4. The vehicle height adjustment apparatus according to claim 3,
   wherein when the working fluid flows from the pressure tank to the vehicle height adjustment unit due to a pressure difference therebetween, the control unit selects at least one of a first flow passage system that is formed when the first and fourth opening and closing valves are opened, and a second flow passage system that is formed when the second and third opening and closing valves are opened.

5. The vehicle height adjustment apparatus according to claim 3,
   wherein when the working fluid flows from the pressure tank toward the vehicle height adjustment unit due to a pressure difference therebetween, the control unit uses a first flow passage system that is formed when the first and fourth opening and closing valves are opened, and a second flow passage system that is formed when the second and third opening and closing valves are opened.

6. The vehicle height adjustment apparatus according to claim 4,
   wherein a fluid regeneration apparatus and a throttle mechanism are disposed at the outlet of the compressor, and the second end of the second opening and closing valve and the first end of the third opening and closing valve are connected to each other and the throttle mechanism.

* * * * *